US008624882B2

(12) United States Patent
Cok et al.

(10) Patent No.: US 8,624,882 B2
(45) Date of Patent: Jan. 7, 2014

(54) DIGITAL DISPLAY WITH INTEGRATED COMPUTING CIRCUIT

(75) Inventors: Ronald S. Cok, Rochester, NY (US); John W. Hamer, Rochester, NY (US); Michael E. Miller, Bellbrook, OH (US)

(73) Assignee: Global OLED Technology LLC, Herndon, VA (US)

( * ) Notice: Subject to any disclaimer, the term of this patent is extended or adjusted under 35 U.S.C. 154(b) by 359 days.

(21) Appl. No.: 13/024,799

(22) Filed: Feb. 10, 2011

(65) Prior Publication Data

US 2012/0206421 A1 Aug. 16, 2012

(51) Int. Cl.
*G06F 3/038* (2013.01)

(52) U.S. Cl.
USPC ............. 345/204; 345/55; 345/76; 315/169.3

(58) Field of Classification Search
USPC ............. 345/76, 77, 55, 82, 92, 99, 100, 204, 345/205; 315/169.3
See application file for complete search history.

(56) References Cited

U.S. PATENT DOCUMENTS

| | | | | |
|---|---|---|---|---|
| 4,769,292 | A | 9/1988 | Tang et al. | |
| 5,061,569 | A | 10/1991 | VanSlyke et al. | |
| 6,582,980 | B2 | 6/2003 | Feldman et al. | |
| 6,879,098 | B2 | 4/2005 | Buchwalter et al. | |
| 7,294,970 | B2 * | 11/2007 | Yang | 315/158 |
| 7,319,432 | B2 * | 1/2008 | Andersson | 343/702 |
| 7,361,939 | B2 | 4/2008 | Wang et al. | |
| 7,557,367 | B2 | 7/2009 | Rogers et al. | |
| 7,622,367 | B1 | 11/2009 | Nuzzo et al. | |
| 2002/0011983 | A1 * | 1/2002 | Yamazaki et al. | 345/92 |
| 2002/0093290 | A1 * | 7/2002 | Yamazaki | 315/169.3 |
| 2003/0151569 | A1 * | 8/2003 | Lee et al. | 345/84 |
| 2005/0073260 | A1 | 4/2005 | Akimoto et al. | |
| 2005/0285830 | A1 * | 12/2005 | Iwabuchi | 345/77 |
| 2006/0055864 | A1 | 3/2006 | Matsumura et al. | |
| 2007/0032089 | A1 | 2/2007 | Nuzzo et al. | |
| 2007/0057263 | A1 | 3/2007 | Kahen | |
| 2007/0222542 | A1 | 9/2007 | Joannopoulos et al. | |
| 2008/0024971 | A1 | 1/2008 | Jackson, Jr. | |
| 2009/0079677 | A1 * | 3/2009 | Kasai | 345/76 |
| 2009/0199960 | A1 | 8/2009 | Nuzzo et al. | |
| 2010/0039030 | A1 * | 2/2010 | Winters et al. | 313/505 |
| 2010/0123268 | A1 | 5/2010 | Menard | |
| 2010/0201275 | A1 | 8/2010 | Cok et al. | |

FOREIGN PATENT DOCUMENTS

| | | | |
|---|---|---|---|
| EP | 1437703 | A1 | 7/2004 |
| WO | WO 2010/046638 | | 4/2010 |

* cited by examiner

*Primary Examiner* — Koosha Sharifi-Tafreshi
(74) *Attorney, Agent, or Firm* — Global OLED Technology LLC

(57) ABSTRACT

A digital display device includes a display substrate; an array of pixels formed on the display substrate; an array of driving circuits located on the display substrate, each driving circuit electrically connected to one or more pixels for controlling a pixel current provided to each pixel; an array of computing circuits located on the display substrate, each computing circuit including circuits for signal or image processing and for communicating with neighboring computing circuits; a plurality of electrical conductors formed on the display substrate and connected to each of the driving circuits and digital computing circuits, wherein each computing circuit is connected with an electrical conductor to each of its neighbors in the array of computing circuits; and means for providing an image signal connected to one or more of the electrical conductors.

25 Claims, 5 Drawing Sheets

DIGITAL DISPLAY WITH INTEGRATED COMPUTING CIRCUIT

CROSS REFERENCE TO RELATED APPLICATIONS

Reference is made to commonly-assigned, co-filed U.S. patent application Ser. No. 13/024,771, filed Feb. 10, 2011, entitled "CHIPLET DISPLAY DEVICE WITH SERIAL CONTROL" by R. Cok et al., the disclosures of which are incorporated by reference herein.

FIELD OF THE INVENTION

The present invention relates to digital display apparatus having a substrate with distributed, independent chiplets for controlling pixels in the display.

BACKGROUND OF THE INVENTION

Many modern computing devices employ graphic user interfaces shown on a display to provide user interaction. The displays can be one of many different peripheral elements controlled by a computer through a communication bus. The core element of a computer is the central processing unit (CPU). The CPU is a stored-program machine that executes software programs stored in memory devices connected to the CPU through the communication bus. Typically, the communication bus also connects the CPU to other computer peripherals, including for example disk drives, keyboards, and a pointing device such as a touch screen, mouse, joystick, touch pad, or track ball. Sometimes the peripherals are connected through single-connection ports, such as the universal serial bus (USB). Some connection ports and buses can connect serially or in parallel to multiple devices.

The conventional architecture for computers is very adaptable but, because each computing element typically performs a single function and is connected to other computing elements through single communication paths, the conventional computer architecture is subject to performance limitations imposed by the performance of a single component, for example memory, memory access rates, a communication bus or port, or the speed of the central processing unit. Parallel computers have been designed to deal with the problem of limited CPU performance, memory access rates, and the interconnection between memory and the CPU. Some parallel computers employ a plurality of CPUs, each with its own memory, connected through communication ports, either point-to-point, or through a global access bus. Other parallel computers employ multiple CPUs and a large, globally accessible memory with a high-speed, multi-connection access bus. These designs address the problem of CPU performance and memory access.

However, computers are increasingly employed in user-interactive, portable, graphic, display-and-image-centric applications, such as internet access, mobile communications, and entertainment such as video gaming and watching video sequences. These applications require a very high bandwidth to the display in a very small, thin, flexible, low-power form factor suitable for user and environmental interaction. Conventional computer architecture designs are not well suited to such applications. Specifically, most traditional designs employ a graphics processor, which can decode and decompress digital signals to a rasterized signal or render graphical objects to a rasterized signal. This rasterized signal is then provided to the display over a high-bandwidth connection. However, this high-bandwidth connection can be expensive and is often limited to a few megabits per second, making it difficult to render images to displays having more than a few million pixels at the required refresh rates.

Flat-panel display devices, for example plasma displays, liquid crystal displays, and area-emissive light-emitting diode (such as organic light-emitting diode or OLED) displays, are widely used in conjunction with computing devices, in portable electronic devices, and for entertainment devices such as televisions. Such displays typically employ a plurality of pixels distributed over a substrate in a display area to display images. Each pixel incorporates several, differently colored light-emitting elements commonly referred to as sub-pixels, typically emitting red, green, and blue light, to represent each image element. As used herein, pixels and sub-pixels are not distinguished and refer to a single light-emitting element. A controller external to the display area drives circuitry that activates each of the pixels, either with active-matrix or passive-matrix control. The controller can include multiple chips, for example as taught in U.S. Pat. Nos. 7,361,939 and 6,582,980. The controller chips can be located on the display substrate, as disclosed in U.S. Patent Application 2005/0073260. Active-matrix circuits include thin-film electronic circuitry on the flat-panel display substrate in the display area constructed using high temperature processes. Passive-matrix circuits employ controllers external to the display and are limited to relatively small displays. An alternative pixel-control method using crystalline silicon substrates used for driving LCD displays is described in U.S. Patent Application Publication No. 2006/0055864. Such flat-panel displays and control methods are limited in the data rates at which the pixels can be controlled by the controller or the communication path between the controller and the pixels.

WO2010046638 describes active matrix devices with chiplets connected in a logical chain.

Many portable laptop computers integrate displays and computing elements in a folding clamshell, and it is known to integrate a display and computer in a common housing (see, e.g. U.S. Patent Publication 2008/0024971) but these systems are constructed on rigid substrates and are thicker and heavier than can be desired. While flat-panel display devices, particularly OLED displays, can be quite thin, it is difficult to build flat-panel displays on flexible structures. Flexible substrates are typically limited to low-temperature processes and require additional processing to construct conventional active-matrix thin-film electronic circuits.

It is known to affix conventional, packaged integrated circuits on a display substrate outside the display area to reduce external parts count and the number of physically separate system elements. A thin form factor is especially important in displays such as OLED displays which can be formed with a thickness of a few millimeters or less. In such displays, electronics packaged outside the display can require a thickness several times the thickness of the display and therefore increase the total display thickness.

Externally accessible circuits that measure OLED pixel performance are known in the prior art. The performance measurements are then used to provide compensation, for example with an external lookup table that processes an image before the image is transferred to a display. These compensation designs suffer from the same bandwidth limitations as conventional display designs and also increase the computing needs for external display controllers. Sophisticated current-controlled pixel-driving circuits are also known, as are circuits that detect emitted light and adjust the driving circuit to provide the desired amount of light. These pixel-control circuits are useful for ensuring that a display emits the desired amount of light specified by a pixel value but do not actually modify the image content as specified by the image pixel values.

There is a need, therefore, for a computer and display architecture that provides a digital display device having improved display bandwidth, a reduced need for external image processing and bandwidth, a thin and flexible form factor, reduced power, a high level of integration, and interactivity.

SUMMARY OF THE INVENTION

In accordance with the present invention, there is provided a digital display device, comprising:

(a) a display substrate having a device side and a display area;

(b) an array of pixels formed on the device side of the display substrate in the display area, each pixel including a first electrode, one or more layers of light-emitting material located over the first electrode, and a second electrode located over the one or more layers of light-emitting material, the pixels emitting light in response to a current passed through the one or more layers of light-emitting material by the first and second electrodes;

(c) an array of driving circuits located on the device side of the display substrate in the display area, each driving circuit electrically connected to one or more pixels for controlling a pixel current provided to each pixel;

(d) an array of computing circuits located on the device side of the display substrate in the display area, each computing circuit including circuits for signal or image processing and for communicating with neighboring computing circuits;

e) a plurality of electrical conductors formed on the device side of the display substrate and connected to each of the driving circuits and digital computing circuits, wherein each computing circuit is connected with an electrical conductor to each of its neighbors in the array of computing circuits; and (f) means for providing an image signal connected to one or more of the electrical conductors.

The present invention has the advantage of providing a display device having improved display bandwidth, a reduced need for external image processing and display bandwidth, a thin and flexible form factor, reduced power, a high level of integration, and interactivity.

Figure 1:
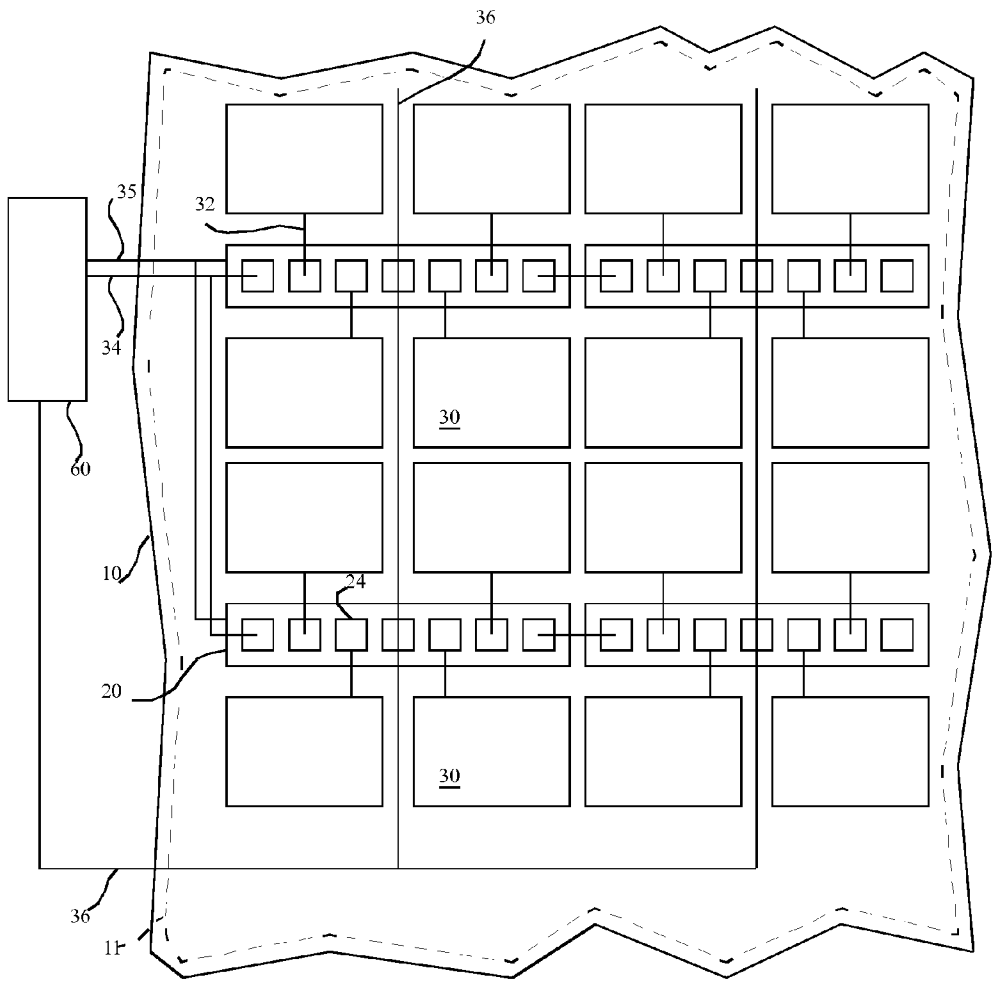
FIG. 1 is a schematic illustrating an embodiment of the present invention.

Because the various layers and elements in the drawings have greatly different sizes, the drawings are not to scale.

DETAILED DESCRIPTION OF THE INVENTION

Figure 2:
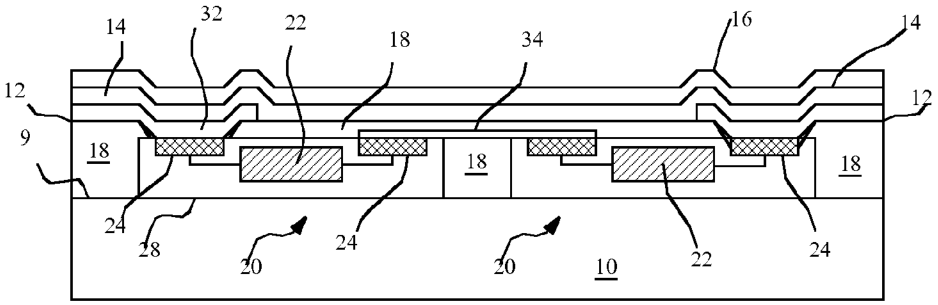
FIG. 2 is a cross section of two chiplets and pixel layers according to an embodiment of the present invention.

Referring to FIGS. 1 and 2 in one embodiment of the present invention, a digital display device comprises a display substrate 10 having a device side 9 and a display area 11 on the device side 9. An array of pixels 30 is formed on the device side 9 of the display substrate 10 in the display area 11, each pixel 30 including a first electrode 12, one or more layers 14 of light-emitting material located over the first electrode 12, and a second electrode 16 located over the one or more layers 14 of light-emitting material, the pixels 30 emitting light in response to a current passed through the one or more layers 14 of light-emitting material by the first and second electrodes 12, 16.

Figure 3:
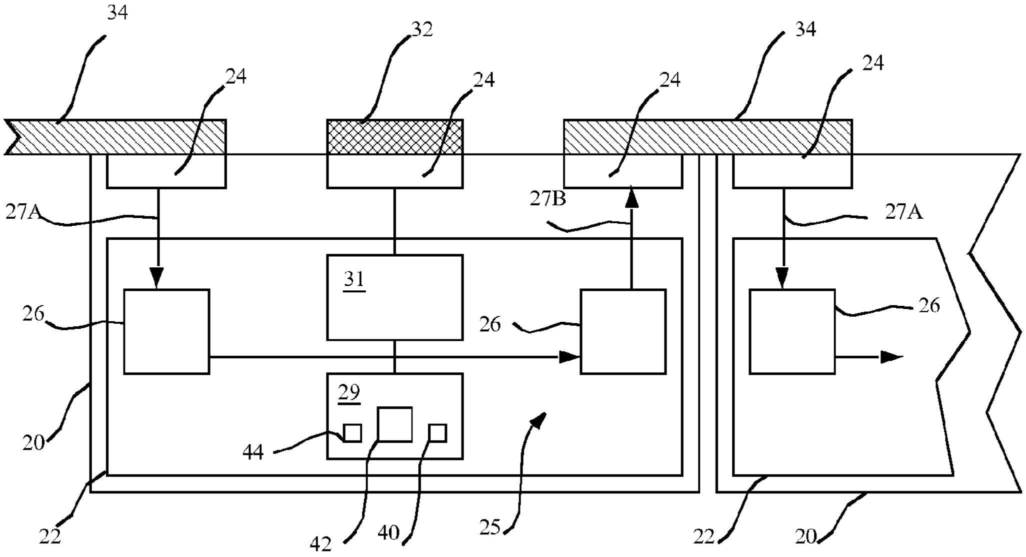
FIG. 3 is a more detailed cross section of two chiplets according to an embodiment of the present invention.

Referring also to FIG. 3, an array of driving circuits 31 is located on the device side 9 of the display substrate 10 within the display area 11, each driving circuit 31 electrically connected to one or more pixels 30 for controlling a pixel current provided to each pixel 30. An array of computing circuits 29 is located on the device side 9 of the display substrate 10 within the display area 11, each computing circuit 29 including circuits for signal or image processing and for communicating with neighboring computing circuits 29. A plurality of electrical conductors 34 are formed on the device side 9 of the display substrate 10 and connected to each of the driving circuits 31 and digital computing circuits 29, wherein each computing circuit 29 is connected with an electrical conductor 34 to each of its neighbors in the array of computing circuits 29. The electrical conductors 34 can be connected to the driving circuits 31 and digital computing circuits 29 through intervening connections or circuitry. Means is provided for providing an image signal, wherein the means is connected to one or more of the electrical conductors 34. The image signal can be a digital, serial signal that is transferred to one or more of the driving or computing circuits 31, 29 through the electrical conductors 34.

In one embodiment of the present invention, the driving circuits 31 or computing circuits 29 are formed in chiplets 20. Chiplets 20 are small, integrated circuits formed in crystalline silicon and located on the process side 9 of the display substrate 10 in the display area 11. Each chiplet 20 includes a chiplet substrate 28 separate and distinct from the display substrate 10. One or more connection pads 24 are formed over the chiplet substrate 28. The connection pads 24 are electrically connected to pixel circuits 22 (that include driving circuits 31 or computing circuits 29) formed within the chiplet 20 and physically contact electrical conductors, 32, 34, 35, 36 to form an electrical connection. The driving and computing circuits 31, 29, can be digital circuits. The electrical conductors 32, 34, 35, 36 can form individual electrically distinct conductors that are connected separately to pixel circuits 22 (each electrical conductor forming a separate point-to-point connection) or can be connected to a plurality of pixel circuits 22 (forming a common bus). The electrical conductors can be electrode connections 32 that electrically connect the pixel circuits 22 to the first or second electrodes 12, 16 through connection pads 24. The electrical conductors can also be signal connections 34, 35, 36 that electrically connect the pixel circuit 22 in one chiplet 20 to another chiplet 20 through connection pads 24. The chiplets 20 can be connected to a controller 60 external to the display area 11 through signal connections (e.g. 34, 35, 36). The chiplets 20 can be adhered to the substrate with a planarization and insulating layer 18. The planarization and insulating layer 18 can also insulate the electrical conductors 32, 34, 35, 36 from each other and the electrodes 12, 16.

As shown in FIG. 3, each chiplet 20 includes at least one pixel circuit 22 formed in the chiplet 20 and electrically connected to the electrode connection pads 24. In one embodiment of the present invention, shown in FIG. 3, the pixel circuit 22 in one chiplet 20 includes both driving circuit 31 and computing circuit 29. In another embodiment of the present invention, the driving circuit 31 and computing circuit 29 are formed in pixel circuits 22 in different chiplets 20. Pixel circuits 22 can also include information (e.g. signals and data) storage circuits (e.g. digital registers). The registers can be store-and-forward circuits 26 that are serially interconnected to form a serial shift register 25 that includes store-and-forward circuits 26 in multiple chiplets 20. The store-and-forward circuits can be interface circuits that mediate the transfer of information into and out of a chiplet 20, from one chiplet 20 to another chiplet 20, or from a controller, or to a controller. A first store-and-forward circuit 26 can receive information from an input 27A connected to a signal connector 34 through a connection pad 24. The store-and-forward circuit 26 can be, for example a digital register such as a D flip-flop. The input information can be communicated to a driving circuit 31 or computing circuit 29 or to a second store-and-forward circuit 26. The second store-and-forward circuit 26 can output information through an output 27B to a connection pad 24 and signal connection 34 to another chiplet 20 where the information is received. In this manner, the serial shift register 25 can communicate the image signal from a controller through multiple chiplets 20 and to the driving circuit 31 and computing circuit 29 in each chiplet 20.

The driving circuit 31 can receive information from the serial shift register 25 and, in response to pixel value information in the image signal, drive the pixels 30 through a connection pad 24 and electrode connector 32 with a current or voltage to cause a current to flow between the electrodes 12 and 16 through the one or more layers of light-emitting material to emit light.

The computing circuit 29 can also receive image signal information from the serial shift register 25 as in FIG. 3. The computing circuit 29 can process the image signal as desired with an image processing circuit 44. The image signal information will typically include either compressed or uncompressed bitmap data. However, this is not necessary and in some embodiments, the image signal will include graphic commands, indicating for example the size, shape, color, and location of graphic objects to be presented on the display. Other characteristics, such as shading can also be provided. Further, the image signal can include multiple, independent signals, which for example, are provided from multiple external sources and each of which corresponds to a different graphic window, graphical overlay to be presented on the display. These multiple, independent signals, can correspond to graphic windows that overlap and can further include a priority signal for indicating the priority for rendering each independent signal, such that the independent signal having the highest priority is rendered on the display while another independent signal having a lower priority but overlapping a higher priority independent signal is not rendered on the display within the overlap area.

Image processing often includes pixel-level computations that will typically be performed within a single computing circuit 29 attached to a single pixel, such as localized tone-scale or color transformations. Such operations can be performed on a fully parallel basis, such that each computing circuit can perform the same manipulations for each pixel on the display. Image processing can also include local-area computations which involve multiple computing circuits 29 and will often require communication between multiple computing circuits 29 and between different chiplets. Such local-area computations can include region-based analysis of images to determine aim tone-scale or color transformations, spatial manipulations, such as sharpening, interpolation, panning, zooming, or rendering of shading gradients across graphical objects and decompression of bitmap data within discrete image blocks, such as the 16×16 image blocks typically employed in JPEG compression. Image processing can also include large-area computations, such as rasterizing and rendering of graphical objects within the image. Each computing circuit 29 can include pixel value storage, for example a frame-store 42. The individual computing circuit 29 within each pixel circuit 22 in a chiplet 20 can store a portion of a complete image, for example a tile that corresponds to the portion of the display that the same chiplet 20 or an associated or neighboring chiplet 20 can control. Computing circuit 29 can either be in the same chiplet as driving circuit 31 or be associated with a driving circuit 31 in another chiplet 20 and thereby control the manipulation and display of pixel tiles within an image. An entire image can be distributed among the pixel circuits 22 within the array of driving or computing circuits 31, 29. The computing circuit 29 can also transfer information to the serial shift register 25, so that processed data can be communicated to other chiplets 20 or to a controller. Because image processing operations tend to be local, the distribution of an image between multiple computing circuits can provide an efficient means of image processing. Because the multiple computing circuits are locally connected to neighboring computing circuits, image data required for local image processing operations can be readily communicated to and from neighboring computing circuits. Interconnections between neighboring computing circuits or driving circuits can be point-to-point, for example with a daisy-chained serial bus, so that each computing circuit can simultaneously communicate with a neighboring computing circuit, providing very high bandwidth in the display device. Because the multiple computing circuits can each be locally connected to an individual pixel driving circuit that locally and independently controls pixel activation, the display can be driven at very high data rates. Hence, the controller 60 serves a more limited function than is found in prior-art displays, for example serving as an image signal source. Multiple such controllers or image sources can be connected to separate bus connections to chiplets 20 to further increase the data rate at which an image signal can be transferred into the display device. Note that in prior art systems, the rasterized image signal is typically transmitted between the controller 60 and the display and this signal must be capable of providing a signal to each pixel at a rate that provides flicker free viewing and continuous motion, requiring data to be transmitted for each pixel at a rate of 30 Hz or higher and typically 70 Hz or higher. In the present invention, the controller 60 only needs to provide an updated signal for a pixel each time that new data is available, significantly reducing the bandwidth that is required between the controller 60 and the display.

It should also be noted that typical pixel-level manipulations of bitmap data often include application of a degamma function to translate input bitmap data, which is typically stored in a nonlinear space, to a color space in which the values are linear with respect to display luminance. This manipulation can often be implemented as a relatively simple equation that can be readily performed by the pixel driving circuits. The translation from a linear space to the final display space, however, often involves a nonlinear lookup table, particularly when the pixel driving circuit provides an analog signal that is nonlinear with respect to the output luminance of the pixel. In prior-art architectures, this nonlinear lookup table is stored in a single location and accessed on a serial basis. However, in display architectures of the present invention, it can be necessary to either replicate this nonlinear lookup table for each pixel driving circuit or to permit parallel access to a common lookup table when such a nonlinear lookup table is necessary. Therefore, in certain embodiments of the present invention, the pixel driving circuit will provide a drive signal that is linear with the luminance output of the pixel 30, such that this nonlinear lookup table is not required. For example the pixel driving circuit can provide either a current to each pixel 30, which is linear with the luminance output of the pixel 30 or a digital-drive signal to pixel 30 wherein the luminance of the pixel 30 is controlled by the proportion of time that the pixel 30 receives a current. Hybrid approaches are also useful in which the pixel is driven with an analog signal (current or voltage) only in regimes in which the analog signal of the pixel is linear or approximately linear with luminance of the pixel 30 and the signal is time modulated to achieve low luminance values, where for example an analog voltage signals are known to be not linear with the luminance output of the pixel 30.

A "computing circuit" is a closed path or paths formed by the interconnection of electronic components through which a signal can flow and that is capable of modifying the input signal values. Typically, modifying the input signal values will include providing a mathematical or logical operation. In some arrangements, the computing circuit modifies the input signal values to create a signal useful for driving the pixels in the display. In some arrangements, in addition to receiving a signal to be modified from an external source, the computing circuit also receives either instructions or parameters that affect the operation of the computing circuit either from an external source or a programmable memory. In some arrangements, the computing circuit includes a digital processor. An individual computing circuit can be associated with one or more pixels in the display. However, this is not required and the computing circuit can be capable of modifying a signal that affects numerous pixels on the display, and can provide a signal that is not displayed as visible information on the display but communicated externally to the display.

The computing circuit can also include one or more sensors 40 (FIG. 3). The sensors can be environmental sensors, for example that sense ambient or emitted light incident on the chiplet, or support user-interactive functions such as an optical touch screen. Sensors can include, for example, an optical sensor, a pressure sensor, an inertial sensor, a temperature sensor, or a radiation sensor. In some arrangements, a portion of the display could be used to receive keyboard input information from touches on the screen corresponding to alphanumeric keys. The sensed information can be communicated to a controller, used within the local chiplet to process information, for example the image signal, or take an action, or can be communicated to other chiplets. Chiplets can also include a frame-store 42 for storing an image or portion of an image, as well as memory for storing a software program. Hence, the computing circuit can be programmable, essentially providing a stored-program computer. Programs within different computing circuits can be the same or different. The programs can be loaded into the chiplet from a controller through a bus as described above.

An image signal can have more pixel values, or fewer, than the display has pixels. The computing circuit can select from among the image signal pixel values to display a subset of the image signal pixel values, or can interpolate between the available pixel values, to display an image signal with the number of pixels in the display. Thus, a frame store can store more pixel values than are in the display pixel array. This feature would allow faster response to instructions from the user to zoom in on the image being displayed in order to see additional details.

The driving circuit can implement an active-matrix control of the pixels, for example as described in U.S. patent application Ser. No. 12/191,478, filed Aug. 14, 2008, entitled "OLED device with embedded chip driving" by Winters et al. Alternatively, the driving circuit can provide a passive-matrix control. In a passive-matrix control method, the pixels are divided into mutually exclusive pixel groups with orthogonal arrays of row and column electrodes defining pixels where the row and column electrodes overlap. The pixels within each pixel group are organized in a two-dimensional array, and each pixel group is controlled by one or more chiplets having at least one driving circuit associated with the pixel group. In this arrangement, the column electrodes in the pixel group can be connected to a set of one or more chiplets while the row electrodes can be connected to a different set of one or more chiplets. The driving circuit can be a passive-matrix row or column control circuit and can be formed in one or separate chiplets.

Figure 4:
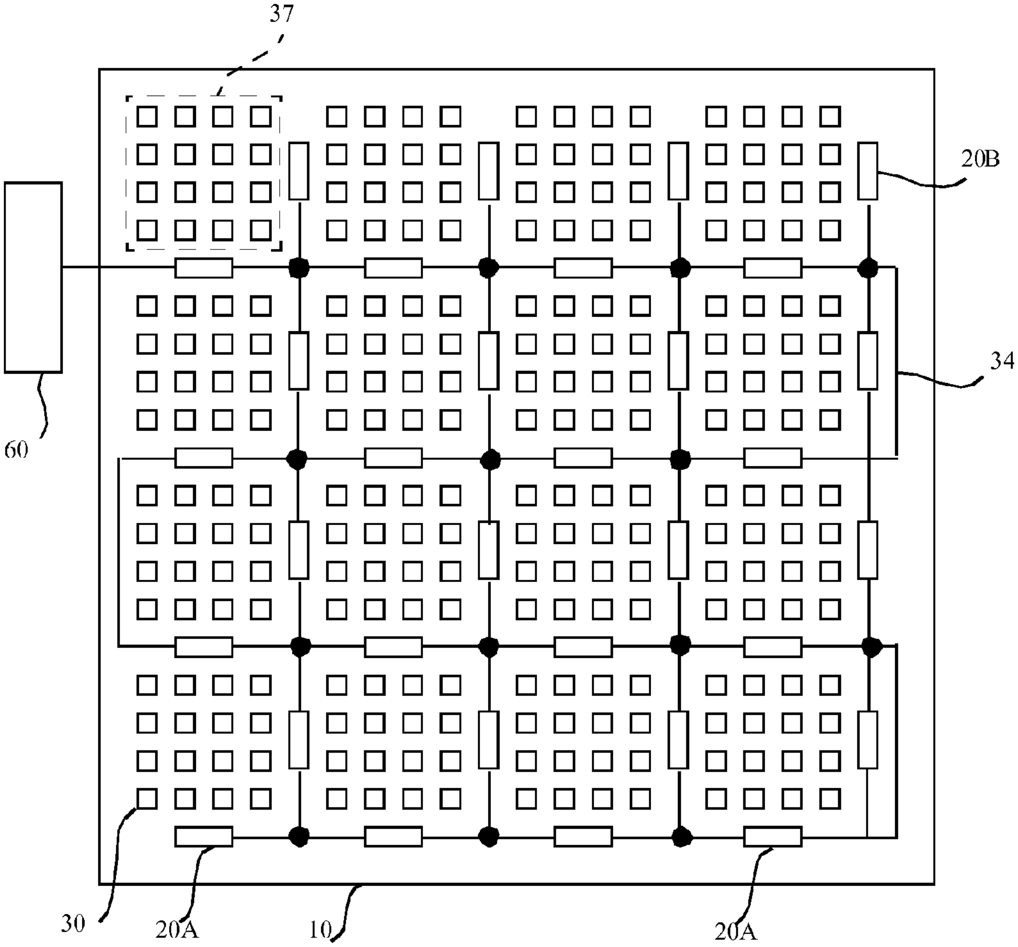
FIG. 4 is a schematic of an array of pixels and chiplets in a display device according to an embodiment of the present invention.
Figure 5:
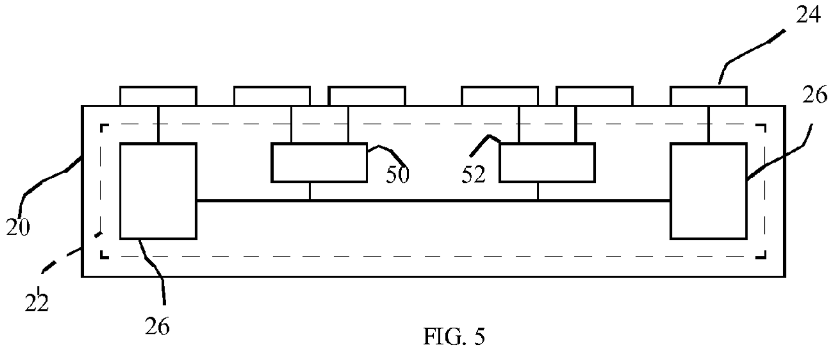
FIG. 5 is a cross section of a chiplet and circuitry according to an embodiment of the present invention.
Figure 6:
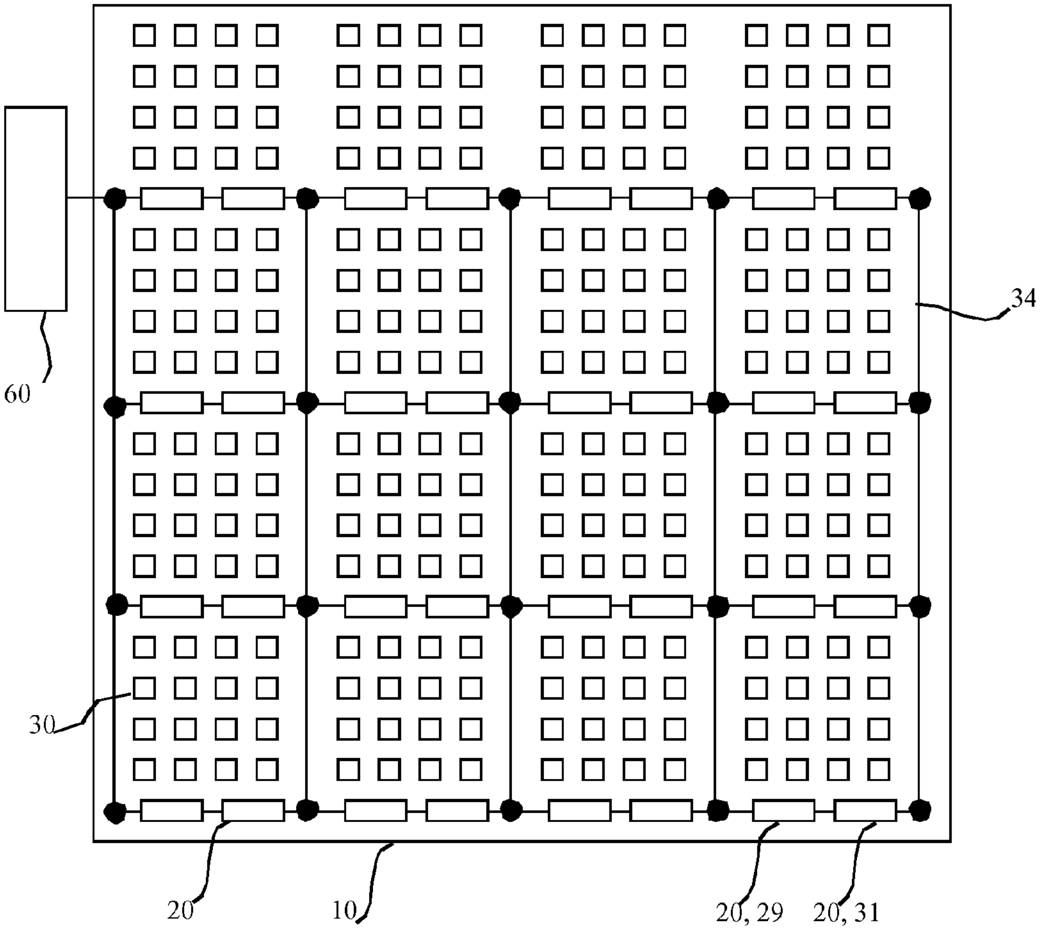
FIG. 6 is a schematic of an array of pixels and chiplets in a display device according to an alternative embodiment of the present invention.
Figure 7:
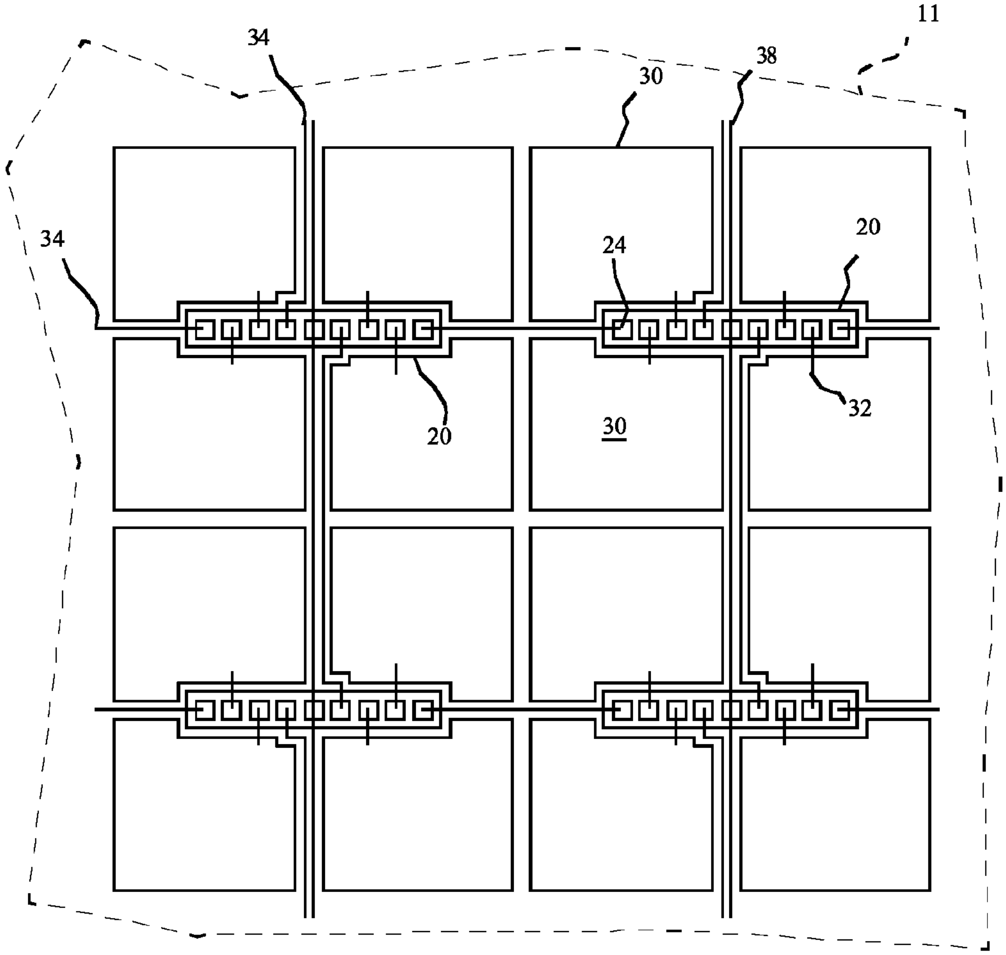
FIG. 7 is a schematic of a partial array of pixels and chiplets in a display device according to an embodiment of the present invention.

As shown in FIG. 4, one set of chiplets 20A can provide column control to a pixel group 37 of pixels 30 formed on a substrate 10 in response to an image signal from a controller 60, while another, different chiplet 20B can provide row control to the pixel group. In various embodiments of the present invention, different chiplets can include different driving circuits; computing circuits can be included in all or only some of the chiplets, or in separate chiplets that do not include driving circuits. Alternatively, as shown in the embodiment of FIG. 5, passive matrix row and column driving circuits 50, 52 can be included in one chiplet 20, together with store-and-forward circuits 26, in a pixel circuit 22, connected to connection pads 24. Thus, each of the driving circuits 31 has an associated and electrically connected computing circuit 44 forming a pixel circuit 22. FIG. 6 illustrates an embodiment in which separate chiplets 20 include driving circuits 31 and computing circuits 29 for processing image signals from a controller 60 through signal connections 35 and driving pixels 30 with the image signal. The controller connects to more than one row of chiplets. In this embodiment, as shown in more detail in FIG. 7, the pixel circuits (not shown within the chiplets 20) form a two-dimensional grid array in the display area 11 and the pixel circuits are electrically connected with each of its neighbors in the array by a serial communication bus formed of the electrical conductors 34. Each signal connection is specific to each pair of chiplets. In contrast, electrical conductors 38 form a common connection connected to all of the pixel circuits within the chiplet 20. Such common connection can provide common signals such as clock, power, or ground signals that assist in controlling the operation of the display device and activation of pixels 30.

In general, each computing circuit communicates with neighboring computing circuits through signal connections. Each signal connection can be point-to-point and connect with only a single nearest neighbor (as in FIGS. 6 and 7). Alternatively, the signal connections can be connected in common to more than two computing circuits (as shown in FIG. 4), or even to all of the computing circuits through a common signal connection (e.g. signal connections connected like electrical conductors 38). The driving and computing circuits are distributed over the substrate in the display area on the same side of the display substrate as the one or more layers of light-emitting material. The circuits are not located solely around the periphery of the pixel array but are located within the array of pixels, that is, beneath, above, or between pixels in the display area. Likewise, if chiplets are employed to form the driving and computing circuits, the chiplets are located within the pixel array in the display area on the same side of the display substrate as the one or more layers of light-emitting material.

A serial bus is one in which data is re-transmitted from one circuit to the next on electrically separated electrical connections; a parallel bus is one in which data is simultaneously broadcast to all of the chiplets on an electrically common electrical connection. A plurality of serially-connected, store- and forward circuits can be included within a chiplet and connected to the electrical connections of the serial bus to form an independent set of store-and-forward circuits on a single serial bus. Moreover, a plurality of serial buses serially-connecting a plurality of chiplets 20 in a plurality of sets can be employed. It is also possible to connect multiple serial buses to a chiplet and to include multiple, serially-connected sets of store-and-forward circuits within one chiplet.

In an embodiment of the present invention, a serial bus connects an image signal source (e.g. a controller) to a first store-and-forward circuit with an electrical conductor. Each store-and-forward circuit on the serial bus connects to the next store-and-forward circuit with an electrically independent electrical conductor, so that all of the electrical conductors can communicate different data from one store-and-forward circuit to the next at the same time, for example in response to a clock signal. The controller provides an image signal having a first digital pixel value and a control signal (e.g. clock) to the first store-and-forward circuit connected to the controller that enables the store-and-forward circuit to store the digital pixel value. Once the first store-and-forward circuit has stored the first digital pixel value, a second digital pixel value can be provided to the first store-and-forward circuit at the same time as the first store-and-forward circuit provides the first digital pixel value to a second store-and-forward circuit connected to the first store-and-forward circuit. The control signal (for example, a clock signal) can be provided to all of the store-and-forward circuits together or can be propagated from one store-and-forward circuit to the next, much as the digital pixel values are propagated. The first store-and-forward circuit then stores the second digital pixel value while the second store-and-forward circuit stores the first digital pixel value. The process is then repeated with a third digital pixel value and a third store-and-forward circuit, and so on, so that digital pixel values are sequentially shifted from one store-and-forward circuit to the next. Each chiplet includes one or more store-and-forward circuits so that the digital pixel values are shifted from one chiplet to the next.

The digital image signal can include control signals to aid in controlling the pixel circuits and store-and-forward circuits. For example, reset and clock signals can be useful. It can also be useful to transmit control signals on signal connectors that are separate from signal connectors on which digital pixel values are transmitted.

The signal connectors can be connected to connection pads on the chiplets. In one embodiment of the present invention, a signal can be connected with an electrically common connector to every chiplet in parallel. In this embodiment, every chiplet will receive the same information at the same time (ignoring propagation delays in the electrically common connector). The electrically common connector can pass through a chiplet. Such a parallel connection is useful for signals that need to be presented to each chiplet at the same time (e.g. a clock, select, reset, or enable signal). In an alternative embodiment, a signal can be connected to one or more chiplets using a serial connection in which the signal passes into a chiplet, is stored in that chiplet, and is then transferred at a later time (e.g. a clock cycle later) to the next serially connected chiplet. Such signals (e.g. data signals) can then be regenerated within a chiplet to maintain the signal integrity. Internal chiplet connections can be employed to connect each store- and forward circuit to the next in a serial fashion within and between chiplets. The internal chiplet connections can also connect to the driving circuits or computing circuits within a chiplet.

Once an image signal is transferred into the computing or driving circuits, the display can be activated to display the image signal pixel values. At the same time as, or before, or after, the pixels are activated, the computing circuit can process the pixel values and transform the pixel values into a processed image. The processed image is caused to be displayed by the driving circuit. The computing circuit can receive more, or fewer, pixel values than the number of pixels an associated driving circuit can activate. Alternatively, the processed image can be communicated to the controller or to other driving and computing circuits for display or further processing.

The present invention provides an advantage over the prior art in providing integrated image processing and display, at high rates within a display device. Prior-art methods, for example using thin-film transistors, cannot provide the digital signal propagation, computation, and driving because the necessary thin-film logic is too large and has low performance. Thus, the present invention provides improved performance over techniques taught in the prior art. By employing a digital image signal, signal accuracy is maintained even when transmitting signals over large display areas, for example a meter in diagonal, or even more. Serial signal connections reduce the number of wires needed to interconnect the pixels in the display to a controller and chiplets formed in crystalline silicon provide high-speed, high-density circuits useful in communicating, processing, and displaying serial, digital pixel values. An array of chiplets enables relatively short, inter-chiplet connections (i.e. electrical connections), reducing signal propagation delays and increasing data transfer rates. Store-and-forward circuits can reconstruct serial digital signals, both data and control signals, as they are transmitted from one chiplet to another, further enabling high-speed communications. The high density of circuits within a chiplet enabled by crystalline silicon chiplet substrates enables complex computational and drive circuitry for the pixels, for example including digital-to-analog converters, active-matrix control circuits, and passive-matrix circuit controllers to be formed within the chiplets. Feedback or fault-detection circuits can also be formed within the chiplets to further improve the performance of the pixel driving circuits and the accuracy, stability, and uniformity of the pixel output. Such feedback signals can include measurements of pixel current or control voltage. Detection circuits can include light detection with photosensors.

In particular, OLED materials are known to age when used, with increased drive current for a given light output. By employing sophisticated current-controlled pixel circuits such as known in the art within the high-circuit-density chiplets, the light output can be consistently controlled over time.

A controller can be implemented as a chiplet and affixed to the display substrate. The controller can be located on the periphery of the display substrate, or can be external to the display substrate and include a conventional integrated circuit.

According to various embodiments of the present invention, the chiplets can be constructed in a variety of ways, for example with one or two rows of connection pads along a long dimension of a chiplet. The signal and electrode connectors can be formed from various materials and use various methods for deposition on the device substrate, for example a metal, either evaporated or sputtered, such as aluminum or aluminum alloys. Alternatively, the signal and electrode connectors can be made of cured conductive inks or metal oxides. In one cost-advantaged embodiment, the signal and electrode connectors are formed in a single layer.

The present invention is particularly useful for multi-pixel device embodiments employing a large device substrate, e.g. glass, plastic, or foil, with a plurality of chiplets arranged in a regular arrangement over the display device substrate. Each chiplet or set of chiplets can control a plurality of pixels formed over the device substrate according to the circuitry in the chiplet(s) and in response to control signals. Individual pixel groups or multiple pixel groups can be located on tiled elements, which can be assembled to form the entire display.

According to the present invention, chiplets provide distributed pixel control and computing elements over a substrate. A chiplet is a relatively small integrated circuit compared to the device substrate and includes one or more pixel circuits including wires, connection pads, passive components such as resistors or capacitors, or active components such as transistors or diodes, formed on an independent substrate. Chiplets are separately manufactured from the display substrate and then applied to the display substrate. Details of these processes can be found, for example, in U.S. Pat. No. 6,879,098; U.S. Pat. No. 7,557,367; U.S. Pat. No. 7,622,367; US20070032089; US20090199960 and US20100123268.

The chiplets are preferably manufactured using silicon or silicon on insulator (SOI) wafers using known processes for fabricating semiconductor devices. Each chiplet is then separated prior to attachment to the device substrate. The crystalline base of each chiplet can therefore be considered a substrate separate from the device substrate and over which the chiplet circuitry is disposed. The plurality of chiplets therefore has a corresponding plurality of substrates separate from the device substrate and each other. In particular, the independent substrates are separate from the substrate on which the pixels are formed and the areas of the independent, chiplet substrates, taken together, are smaller than the device substrate. Chiplets can have a crystalline substrate to provide higher-performance active components than are found in, for example, thin-film amorphous or polycrystalline silicon devices. Chiplets can have a thickness preferably of 100 um or less, and more preferably 20 um or less. This facilitates formation of the adhesive and planarization material over the chiplet that can then be applied using conventional spin-coating techniques. According to one embodiment of the present invention, chiplets formed on crystalline silicon substrates are arranged in a geometric array and adhered to a device substrate (e.g. 10) with adhesion or planarization materials. Connection pads on the surface of the chiplets are employed to connect each chiplet to signal wires, power buses and row or column electrodes to drive pixels. Chiplets can control at least four pixels.

Since the chiplets are formed in a semiconductor substrate, the circuitry of the chiplet can be formed using modern lithography tools. With such tools, feature sizes of 0.5 microns or less are readily available. For example, modern semiconductor fabrication lines can achieve line widths of 90 nm or 45 nm and can be employed in making the chiplets of the present invention. The chiplet, however, also requires connection pads for making electrical connection to the wiring layer provided over the chiplets once assembled onto the display substrate. The connection pads can be sized based on the feature size of the lithography tools used on the display substrate (for example 5 um) and the alignment of the chiplets to the wiring layer (for example +/−5 um). Therefore, the connection pads can be, for example, 15 um wide with 5 um spaces between the pads. This means that the pads will generally be significantly larger than the transistor circuitry formed in the chiplet.

The pads can generally be formed in a metallization layer on the chiplet over the transistors. It is desirable to make the chiplet with as small a surface area as possible to enable a low manufacturing cost.

By employing chiplets with independent substrates (e.g. comprising crystalline silicon) having circuitry with higher performance than circuits formed directly on the substrate (e.g. amorphous or polycrystalline silicon), a device with higher performance and greater functionality is provided. Since crystalline silicon has not only higher performance but also much smaller active elements (e.g. transistors), the circuitry size is much reduced. A useful chiplet can also be formed using micro-electro-mechanical (MEMS) structures, for example as described in "A novel use of MEMS switches in driving AMOLED", by Yoon, Lee, Yang, and Jang, Digest of Technical Papers of the Society for Information Display, 2008, 3.4, p. 13.

The device substrate can include glass and the wiring layers made of evaporated or sputtered metal or metal alloys, e.g. aluminum or silver, formed over a planarization layer (e.g. resin) patterned with photolithographic techniques known in the art. The chiplets can be formed using conventional techniques well established in the integrated circuit industry. Wiring and first electrodes can be formed using known photolithographic techniques. Layer of light emitting material and second electrodes can be formed using processes known in the OLED art.

In embodiments of the present invention using differential signal pairs, the substrate can preferably be foil or another solid, electrically-conductive material, and the two serial buses forming a differential signal pair can be laid out in a differential microstrip configuration referenced to the substrate, as known in the electronics art. In displays using non-conductive substrates, the differential signal pair can preferentially be referenced to the second electrode, and routed so that no portion of the first electrode of any pixel is located between the second electrode and either serial bus in the differential pair. LVDS (EIA-644), RS-485 or other differential signalling standards known in the electronics art can be employed on the differential signal pairs. A balanced DC encoding such as 4b5b can be employed to format data transferred across the differential signal pair, as known in the art.

The present invention can be employed in devices having a multi-pixel infrastructure. In particular, the present invention can be practiced with LED devices, either organic or inorganic, and is particularly useful in information-display devices. In a preferred embodiment, the present invention is employed in a flat-panel OLED device composed of small-molecule or polymeric OLEDs as disclosed in, but not limited to U.S. Pat. No. 4,769,292 and U.S. Pat. No. 5,061,569. Inorganic devices, for example, employing quantum dots formed in a polycrystalline semiconductor matrix (for example, as taught in US 2007/0057263), and employing organic or inorganic charge-control layers, or hybrid organic/inorganic devices can be employed. Many combinations and variations of organic or inorganic light-emitting displays can be used to fabricate such a device, including active-matrix displays having either a top- or bottom-emitter architecture.

As noted above, an important advantage of the present invention is to provide a display and computing structure that is extremely light weight and thin. However, as seen in prior-art display systems such as cellular telephones, a significant bulk is necessary to house electrical connectors and power supplies, in addition to computing circuits. Therefore, it is useful within embodiments of the present invention to form metal layers within the display that can serve as radio antennas to provide RF communication, so that data can be communicated to the display via wireless, electromagnetic communication. Similarly one or more resonant antennas can be formed on the display substrate or formed on another relatively thin substrate and attached to the display substrate to facilitate resonant electromagnetic energy transfer. Such resonant electromagnetic energy transfer methods are known in the art, such as those taught by U.S. Ser. No. 11/481,077.

In these or other embodiments, separate circuits can be formed on or attached to the display substrate for controlling power. In some useful embodiments, power circuits will be formed that are capable of switching and conditioning power from an external source to each of the power buses to supply power to the remaining elements of the display. Such power circuits can be formed from silicon but they can also be formed from other materials, including gallium. Such components can also be attached to the substrate to condition and control the flow of power to the display.

The invention has been described in detail with particular reference to certain preferred embodiments thereof, but it should be understood that variations and modifications can be effected within the spirit and scope of the invention.

PARTS LIST

9 process side
10 display substrate
11 display area
12 first electrode
14 layer of light-emitting material
16 second electrode
18 planarization/insulating layer
20 chiplet
20A column-driving chiplet
20B row-driving chiplet
22 pixel circuit
24 connection pad
25 serial shift register
26 store-and-forward circuit
27A input
27B output
28 chiplet substrate
29 computing circuit
30 pixel
31 driving circuit
32 electrode connector, electrical conductor
34 signal connector, electrical conductor
35 signal connector, electrical conductor
36 signal connector, electrical conductor
37 pixel group
38 common connector, electrical conductor
40 sensor
42 frame-store
44 image-processing circuit
50 row-driver circuit
52 column-driver circuit
60 controller

The invention claimed is:

1. A digital display device, comprising:
(a) a display substrate having a display area on a device side;
(b) an array of pixels formed on the device side of the display substrate in the display area, each pixel including a first electrode, one or more layers of light-emitting material located over the first electrode, and a second electrode located over the one or more layers of light-emitting material, the pixels emitting light in response to a current passed through the one or more layers of light-emitting material by the first and second electrodes;
(c) an array of driving circuits located on the device side of the display substrate in the display area, each driving circuit electrically connected to one or more pixels for controlling a pixel current provided to each pixel;
(d) an array of computing circuits located on the device side of the display substrate in the display area, each computing circuit including circuits for signal or image processing and for communicating through a serial bus with neighboring computing circuits where the computing circuits are connected to the driving circuits through the serial bus;
(e) a plurality of conductors formed on the device side of the display substrate and connected to each of the driving circuits and digital computing circuits, wherein each computing circuit is connected with a conductor to each of its neighbors in the array of computing circuits;
(f) means for providing an image signal connected to one or more of the conductors.

2. A digital display device, comprising:
(a) a display substrate having a display area on a device side;
(b) an array of pixels formed on the device side of the display substrate in the display area, each pixel including a first electrode, one or more layers of light-emitting material located over the first electrode, and a second electrode located over the one or more layers of light-emitting material, the pixels emitting light in response to a current passed through the one or more layers of light-emitting material by the first and second electrodes;
(c) an array of driving circuits located on the device side of the display substrate in the display area, each driving circuit electrically connected to one or more pixels for controlling a pixel current provided to each pixel;
(d) an array of computing circuits located on the device side of the display substrate in the display area, each computing circuit including circuits for signal or image processing and for communicating with neighboring computing circuits;
(e) a plurality of conductors formed on the device side of the display substrate and connected to each of the driving circuits and digital computing circuits, wherein each computing circuit is connected with a conductor to each of its neighbors in the array of computing circuits;
(f) means for providing an image signal connected to one or more of the conductors; and wherein the pixels are divided into mutually exclusive pixel groups, the pixels within each pixel group are organized in a two-dimensional array, and each pixel group is associated with one or more chiplets having at least one computing circuit for controlling the pixel group.

3. The display device of claim 2, wherein the computing circuits form a two-dimensional array and further comprising a passive-matrix row or column control circuit connected to each row or column of the two-dimensional array of computing circuits.

4. The display device of claim 3, wherein the passive-matrix row or column control circuit are provided in the chiplet(s).

5. The display device of claim 1, wherein the image signal is a digital serial signal.

6. The display device of claim 1, wherein each of the driving circuits has an associated and electrically connected computing circuit forming a pixel circuit.

7. The display device of claim 6, wherein the pixel circuits form a two-dimensional grid array in the display area and the pixel circuits are electrically connected with each of its neighbors in the array by a serial communication bus formed of the electrical conductors.

8. The display device of claim 1, further comprising a sensor in the computing circuit.

9. The display device of claim 8, wherein the sensor is an optical sensor, a pressure sensor, an inertial sensor, a temperature sensor, or a radiation sensor.

10. The display device of claim 1, wherein the computing circuit includes image-processing circuitry for processing the image signal.

11. The display device of claim 10, wherein the image signal is encoded and the computing circuit includes image-processing circuitry that decodes the image signal.

12. The display device of claim 11, further comprising a sensor in the computing circuit and wherein the computing circuit processes the image signal in response to the sensor.

13. The display device of claim 1, wherein the computing circuit includes an image frame-store.

14. The display device of claim 13, wherein the pixel array has fewer pixels than the image signal and the image frame-store stores more pixels than the pixel array.

15. The display device of claim 1, wherein the computing circuit is a digital circuit.

16. The display device of claim 15, wherein the computing circuit is a programmable circuit.

17. The display device of claim 1, wherein the conductor is an electrical conductor or an optical conductor.

18. A digital display device, comprising:

(a) a display substrate having a device side;

(b) an array of pixels formed on the device side of the display substrate in a display area, each pixel including a first electrode, one or more layers of light-emitting material located over the first electrode, and a second electrode located over the one or more layers of light-emitting material, the pixels emitting light in response to a current passed through the one or more layers of light-emitting material by the first and second electrodes;

(c) an array of driving circuits located on the device side of the display substrate in the display area, each driving circuit electrically connected to one or more pixels for controlling a pixel current provided to each pixel;

(d) an array of computing circuits located on the device side of the display substrate in the display area, each computing circuit including circuits for signal or image processing and for communicating through a serial bus with neighboring computing circuits where the computing circuits are connected to the driving circuits through the serial bus;

e) a plurality of electrical conductors formed on the device side of the display substrate and connected to each of the driving circuits and digital computing circuits, wherein each computing circuit is connected with an electrical conductor to each of its neighbors in the array of computing circuits; and (f) means for providing an image signal connected to one or more of the electrical conductors; and (g) wherein the driving circuits and computing circuits are provided in chiplets, each chiplet having a substrate separate and independent of the display substrate.

19. The display device of claim 18, further comprising an interface circuit that is connected to the array of computing circuits and to an external information source.

20. The display device of claim 18, wherein the driving circuits are provided in first chiplets and the computing circuits are provided in second chiplets separate and different from the first chiplets.

21. The display device of claim 18, wherein at least one of the driving circuits and at least one of the computing circuits are provided in the same chiplet.

22. The display device of claim 18, wherein the chiplets include one or more connection pads formed on the chiplet substrate, and wherein the connection pads physically contact the electrical conductors.

23. The display device of claim 18, wherein the pixels are divided into mutually exclusive pixel groups, the pixels within each pixel group are organized in a two-dimensional array, and each pixel group is controlled by one or more chiplets having at least one computing circuit associated with the pixel group.

24. The display device of claim 18, wherein each of the driving circuits has an associated and electrically connected computing circuit forming a pixel circuit.

25. The display device of claim 24, wherein the pixel circuits form a two-dimensional grid array in the display area and the pixel circuits are electrically connected with each of its neighbors in the array by a serial communication bus formed of the electrical conductors.

* * * * *